United States Patent
Saiki et al.

(10) Patent No.: US 10,074,192 B2
(45) Date of Patent: Sep. 11, 2018

(54) SUBSTRATE INSPECTION APPARATUS AND CONTROL METHOD THEREOF

(71) Applicant: TOKYO ELECTRON LIMITED, Tokyo (JP)

(72) Inventors: Kenta Saiki, Nirasaki (JP); Shinji Akaike, Nirasaki (JP)

(73) Assignee: TOKYO ELECTRON LIMITED, Tokyo (JP)

( * ) Notice: Subject to any disclaimer, the term of this patent is extended or adjusted under 35 U.S.C. 154(b) by 286 days.

(21) Appl. No.: 14/864,981

(22) Filed: Sep. 25, 2015

(65) Prior Publication Data

US 2016/0098837 A1    Apr. 7, 2016

(30) Foreign Application Priority Data

Oct. 7, 2014    (JP) ................................. 2014-206359

(51) Int. Cl.
*G06T 7/73* (2017.01)

(52) U.S. Cl.
CPC ...... *G06T 7/73* (2017.01); *G06T 2207/30148* (2013.01); *G06T 2207/30204* (2013.01); *G06T 2207/30244* (2013.01)

(58) Field of Classification Search
CPC ........... B01J 2219/00509; G01N 21/93; G01N 21/95607; G02B 5/201; H01L 21/682; H01L 21/67259; H01L 21/67092; H01L 21/681; G01R 31/2887; G03F 1/00; G03F 9/7088; G03F 9/7011; G03F 9/7076; B23K 26/03; G21K 7/00
See application file for complete search history.

(56) References Cited

U.S. PATENT DOCUMENTS

| | | | | |
|---|---|---|---|---|
| 5,905,850 A | * | 5/1999 | Kaveh | H01L 21/67259 198/394 |
| 5,999,268 A | * | 12/1999 | Yonezawa | G01R 31/2887 324/750.19 |
| 7,473,502 B1 | * | 1/2009 | Ausschnitt | G03F 7/70516 430/22 |
| RE41,924 E | * | 11/2010 | Nemets | B23K 26/04 250/208.1 |

(Continued)

FOREIGN PATENT DOCUMENTS

JP    07-297242 A    11/1995

*Primary Examiner* — Dramos I Kalapodas
(74) *Attorney, Agent, or Firm* — Nath, Goldberg & Meyer; Jerald L. Meyer (57) ABSTRACT

A method of controlling a substrate inspection apparatus, which includes a stage configured to mount a substrate thereon and move in first and second moving directions and a camera configured to photograph the stage. The method includes: calculating in each quadrant divided by X and Y axis defining a coordinate system of an image photographed by the camera, a deviation of the X axis in a rotational direction with respect to the first moving direction or a deviation of the Y axis in the rotational direction with respect to the second moving direction; correcting a position of a photographed target in the coordinate system of the image photographed by the camera based on the calculated deviation in the rotational direction; and performing an alignment of the stage based on the corrected position of the target.

6 Claims, 8 Drawing Sheets

(56) References Cited

U.S. PATENT DOCUMENTS

| | | | | |
|---|---|---|---|---|
| 8,374,818 B2* | 2/2013 | Meijles | .................. | G01N 21/93 |
| | | | | 702/158 |
| 2003/0054574 A1* | 3/2003 | Tanaka | .................. | G03F 9/7003 |
| | | | | 438/4 |
| 2004/0189995 A1* | 9/2004 | Tanaka | .................. | G03F 9/7003 |
| | | | | 356/401 |
| 2005/0045821 A1* | 3/2005 | Noji | ..................... | G01N 23/225 |
| | | | | 250/311 |
| 2005/0264777 A1* | 12/2005 | Gardner | ............. | G03F 7/70275 |
| | | | | 355/53 |
| 2011/0001974 A1* | 1/2011 | Harada | ................. | G03F 9/7011 |
| | | | | 356/401 |
| 2012/0009051 A1* | 1/2012 | Ruth | ..................... | B65G 47/22 |
| | | | | 414/783 |
| 2018/0151400 A1* | 5/2018 | Wang | ..................... | H01L 21/68 |

\* cited by examiner

SUBSTRATE INSPECTION APPARATUS AND CONTROL METHOD THEREOF

CROSS-REFERENCE TO RELATED APPLICATION

This application claims the benefit of Japanese Patent Application No. 2014-206359, filed on Oct. 7, 2014, in the Japan Patent Office, the disclosure of which is incorporated herein in its entirety by reference.

TECHNICAL FIELD

The present disclosure relates to a substrate inspection apparatus and a control method thereof, and more particularly, to a substrate inspection apparatus including a stage, which moves with a substrate mounted thereon, and a control method thereof.

BACKGROUND

A prober is known as a substrate inspection apparatus which inspects electric characteristics of a semiconductor device, such as a power device or a memory, formed on a semiconductor wafer (hereinafter, simply referred to as a "wafer") as a substrate.

The prober includes a disc-shaped probe card having a plurality of probe needles, and a stage which freely moves in upward, downward, leftward and rightward directions with a wafer mounted thereon. As the stage having the wafer mounted thereon moves toward the probe card, each probe needle of the probe card is brought into contact with an electrode pad or a solder bump of the semiconductor device, and an inspection current is allowed to flow into the electrode pad or the solder bump from the probe needle, whereby the prober inspects electrical properties of a semiconductor device.

Also, the prober includes a camera so as to accurately bring each probe needle into contact with an electrode pad or a solder bump, and the camera is installed at an alignment bridge facing the stage to accurately specify a position of the stage. In the prober, the camera photographs a target indicating the position of the stage, and the position of the stage is specified based on the position of the target in a coordinate system of the image photographed by the camera. In the prober, the target is moved to the origin of the coordinate system of the image of the camera, thereby performing a position adjustment (alignment) of the stage at a reference position. At this time, a distance from the position of the target in the coordinate system of the image of the camera to the origin of the coordinate system is calculated, and the calculated distance is converted into a displacement amount of the stage.

While the coordinate system of the image of the camera is defined by X and Y axes perpendicular to each other in a horizontal plane, the stage is also configured to be movable in the two directions (X and Y directions) perpendicular to each other in the horizontal plane. In this case, the camera is installed at the alignment bridge such that the X and Y axes of the coordinate system of the image coincide with the two moving directions (X and Y directions) of the stage, respectively.

However, due to an installation defect of the camera to the alignment bridge caused by a relative error of the camera in the rotational direction with respect to the stage, or an influence such as an aberration of a lens in the camera or a deviation of the stage in the moving direction, the X and Y axes in the coordinate system of the camera may not coincide with the X and Y directions of the stage, respectively. For example, the X axis may be deviated by a minute rotation angle in the rotational direction with respect to the X direction, and the Y axis may be deviated by a minute rotation angle in the rotational direction with respect to the Y direction.

In this case, although in order to perform an alignment of the stage, the distance from the position of the target in the coordinate system of the image of the camera to the origin of the coordinate system is calculated and the calculated distance is converted into the displacement amount of the stage, since the position of the target includes a deviation of the X axis in the rotational direction with respect to the X direction or a deviation of the Y axis in the rotational direction with respect to the Y direction, the displacement amount of the stage becomes inaccurate, and as a result, an accurate alignment of the stage cannot be performed.

SUMMARY

Some embodiments of the present disclosure provide to a substrate inspection apparatus and a control method thereof capable of performing an accurate alignment of a stage.

According to one embodiment of the present disclosure, there is provided a method of controlling a substrate inspection apparatus. The substrate inspection apparatus includes a stage configured to mount a substrate thereon and a camera configured to photograph the stage. The stage moves in a first moving direction in a horizontal plane and a second moving direction perpendicular to the first moving direction in the horizontal plane, and the camera is arranged to face the horizontal plane. A coordinate system of an image photographed by the camera is defined by an X axis and a Y axis perpendicular to each other in the horizontal plane, and the X axis corresponds to the first moving direction and the Y axis corresponds to the second moving direction. The camera photographs a target indicating a position of the stage, and an alignment of the stage is performed based on a position of the photographed target in the coordinate system of the image photographed by the camera. The method includes: calculating in each quadrant divided by the X axis and the Y axis, a deviation of the X axis in a rotational direction with respect to the first moving direction or a deviation of the Y axis in the rotational direction with respect to the second moving direction; correcting the position of the photographed target in the coordinate system of the image photographed by the camera based on the calculated deviation in the rotational direction; and performing an alignment of the stage based on the corrected position of the target.

According to another embodiment of the present disclosure, there is provided a substrate inspection apparatus including a stage configured to mount a substrate thereon and a camera configured to photograph the stage. The stage moves in a first moving direction in a horizontal plane and a second moving direction perpendicular to the first moving direction in the horizontal plane, and the camera is arranged to face the horizontal plane. A coordinate system of an image photographed by the camera is defined by an X axis and a Y axis perpendicular to each other in the horizontal plane, and the X axis corresponds to the first moving direction and the Y axis corresponds to the second moving direction. The camera photographs a target indicating a position of the stage. The substrate inspection apparatus further includes a control part configured to calculate in each quadrant divided by the X axis and the Y axis, a deviation of the X axis in a rotational direction with respect to the first moving direction or a deviation of the Y axis in the rotational direction with respect to the second moving direction; correct the position of the photographed target in the coordinate system of the image photographed by the camera based on the calculated deviation in the rotational direction; and perform an alignment of the stage based on the corrected position of the target.

BRIEF DESCRIPTION OF THE DRAWINGS

The accompanying drawings, which are incorporated in and constitute a part of the specification, illustrate embodiments of the present disclosure, and together with the general description given above and the detailed description of the embodiments given below, serve to explain the principles of the present disclosure.

DETAILED DESCRIPTION

Reference will now be made in detail to various embodiments, examples of which are illustrated in the accompanying drawings. In the following detailed description, numerous specific details are set forth in order to provide a thorough understanding of the present disclosure. However, it will be apparent to one of ordinary skill in the art that the present disclosure may be practiced without these specific details. In other instances, well-known methods, procedures, systems, and components have not been described in detail so as not to unnecessarily obscure aspects of the various embodiments.

Figure 1:
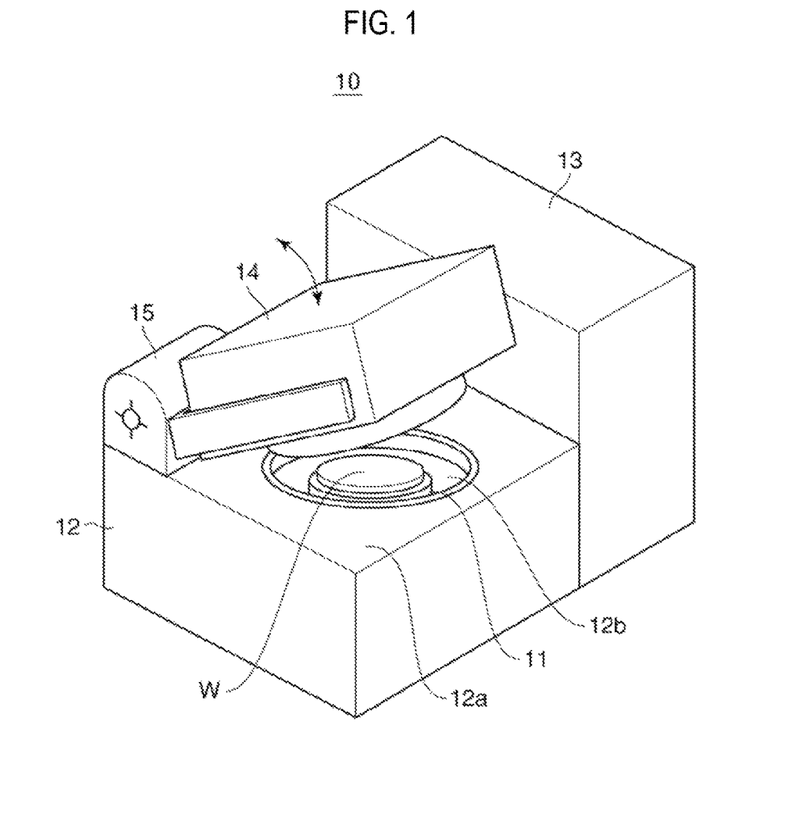
FIG. 1 is a perspective view schematically illustrating a configuration of a prober as a substrate inspection apparatus according to an embodiment of the present disclosure.

FIG. 1 is a perspective view schematically illustrating a configuration of a prober as a substrate inspection apparatus according to an embodiment of the present disclosure.

In FIG. 1, the prober 10 includes a main body 12 in which a stage 11 having a wafer W mounted thereon is housed, a loader 13 disposed adjacent to the main body 12, and a test head 14 disposed to cover the main body 12. The prober 10 inspects electrical properties of a semiconductor device formed on the wafer W having a large diameter of, for example, 300 mm or 450 mm.

The main body 12 has a shape of a housing having a hollow inside, and an opening 12b opened upward from the wafer W mounted on the stage 11 is formed in a ceiling portion 12a. A substantially disc-shaped probe card holder (not illustrated) is engaged to the opening 12b. The probe card holder holds a disc-shaped probe card 16 (see FIG. 2 described later). With this configuration, the probe card 16 faces the wafer W mounted on the stage 11.

The test head 14 has a shape of a cube and is configured to be rotatable upward by a hinge mechanism 15 mounted on the main body 12. When the test head 14 covers the main body 12, the test head 14 is electrically connected to the probe card 16 through a contact ring (not shown). The test head 14 includes a ring shaped data storage part (not illustrated) configured to store, as a measurement data, an electrical signal representing electrical properties of a semiconductor device, which is transmitted from the probe card 16, and a determination part (not illustrated) configured to determine whether or not an electrical defect occurs in the semiconductor device of the wafer W as an inspection target based on the corresponding measurement data.

The loader 13 takes out the wafer W having the semiconductor device formed thereon, from a FOUP (not illustrated) that is a transfer vessel accommodating the wafer W, and mounts the wafer W on the stage 11 of the main body 12. Also, the loader 13 removes the wafer W, on which the test of electrical properties of the semiconductor device is terminated, from the stage 11, and accommodates the wafer W in the FOUP.

A plurality of probe needles (not illustrated) is concentratedly disposed on a surface of the probe card 16, which faces the stage 11. In the prober 10, the stage 11 moves to adjust the relative position between the probe card 16 and the wafer W, thereby allowing an electrode pad or the like of the semiconductor device to be contacted with each probe needle.

When the electrode pad or the like of the semiconductor device is brought into contact with each probe needle, the test head 14 allows a test current to flow into the semiconductor device through each probe needle of the probe card 16. Thereafter, the probe card 16 transmits an electrical signal representing electrical properties of the semiconductor device to the data storage part of the test head 14, and the data storage part stores the transmitted electrical signal as measurement data. The determination part determines whether or not an electrical defect occurs in the semiconductor device as an inspection target based on the stored measurement data.

Figure 2:
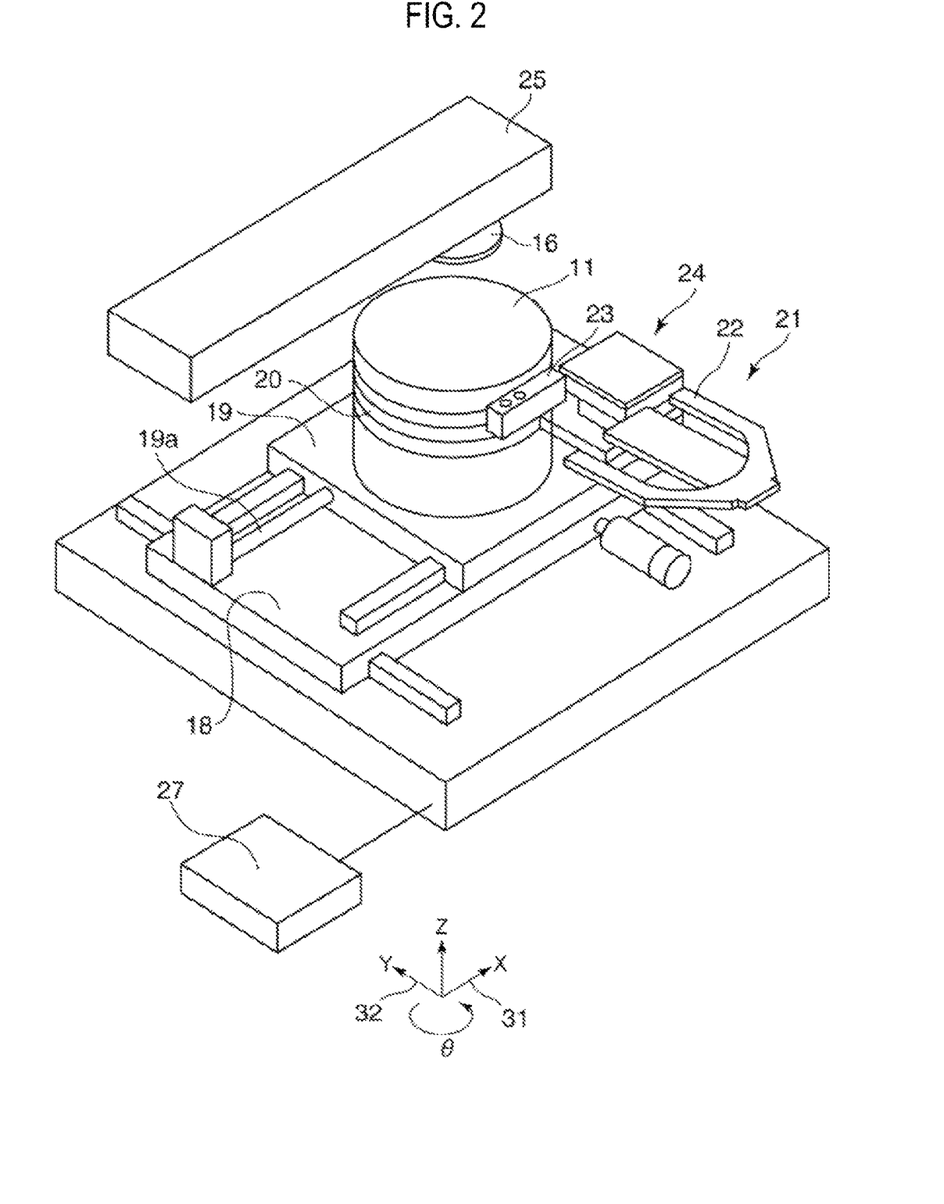
FIG. 2 is a perspective view schematically illustrating an internal configuration of a main body of the prober of FIG. 1.

FIG. 2 is a perspective view schematically illustrating an internal configuration of the main body of the prober of FIG. 1.

In FIG. 2, the stage 11 is supported by a Y-direction moving unit 18, which moves along a Y direction 32 (a second moving direction) illustrated in FIG. 2, an X-direction moving unit 19, which moves along an X direction 31 (a first moving direction) illustrated in FIG. 2, and a Z-direction moving unit 20, which moves along a Z direction illustrated in FIG. 2 to move the stage 11 toward the probe card 16.

The Y-direction moving unit 18 is driven with high accuracy in the Y direction 32 by rotation of a ball screw (not illustrated) disposed along the Y direction 32. The ball screw is rotated by a motor (not illustrated) for the Y-direction moving unit 18 as a servomotor. The X-direction moving unit 19 is driven with high accuracy in the X-direction 31 by rotation of a ball screw 19a disposed along the X-direction 31. The ball screw 19a is also rotated by a motor (not illustrated) for the X-direction moving unit 19 as a servomotor. The stage 11 is disposed on the Z-direction moving unit 20 such that the stage 11 can rotate in a direction θ illustrated in FIG. 2, and a wafer W is mounted on the stage 11.

That is, since the Y-direction moving unit 18 and the X-direction moving unit 19 enable the stage 11 to move in the X-direction 31 and the Y-direction 32 and the X-direction 31 and the Y-direction 32 are perpendicular to each other in the horizontal plane, the stage 11 moves in two directions perpendicular to each other in the horizontal plane. The Z-direction moving unit 20 also allows the stage 11 to move toward the probe card 16 along the Z-direction, and brings an electrode pad or the like of a semiconductor device on the wafer W into contact with each probe needle.

A probe card holder guide 21 is disposed adjacent to the stage 11 in the main body 12. The probe card holder guide 21 is configured to have a two-branch-shaped fork 22 capable of supporting a probe card holder, which holds the probe card 16, and to be movable in the Y direction 32 and the Y-direction, thereby performing the replacement of the probe card 16.

In addition, an ASU camera 23 and a needle tip grinding unit 24 are disposed between the stage 11 and the probe card holder guide 21 in the main body 12. An alignment bridge 25 is also disposed above the stage 11.

The ASU camera 23 and the needle tip grinding unit 24 are fixedly installed in the stage 11 and are configured to be integrally movable together with the stage 11 in the Y direction 32, the X direction 31, and the Z direction. The alignment bridge 25 has a bottom surface in a horizontal plane facing the stage 11 and the ASU camera 23, and an alignment bridge camera (not illustrated) is installed on such a bottom surface to face the stage 11. The ASU camera 23 is disposed to face the bottom surface of the alignment bridge 25. In the stage 11, a target mechanism (not illustrated) which integrally moves together with the stage 11 and has a target mark 26 protrudable to a confocal surface of the ASU camera 23 and the alignment bridge camera is mounted in the vicinity of the ASU camera 23. The alignment bridge camera and the ASU camera 23 photograph the target mark 26 protruding from the target mechanism.

The prober 10 further includes a control part 27. The control part 27 controls the operation of each component of the prober 10.

However, in order to bring each probe needle of the probe card 16 into contact with an electrode pad or the like on the wafer W, the prober 10 performs the position alignment of the stage 11 having the wafer W mounted thereon to a reference position, calculates a distance from the reference position of the stage 11 to the electrode pad to be brought into contact with the probe needle, and moves the stage 11 based on the calculated distance. That is, in order to inspect electrical properties of a semiconductor device using the prober 10, it is required to perform the alignment of the stage 11 before the inspection of the electrical properties.

Accordingly, the alignment bridge camera photographs the target mark 26 protruding from the target mechanism, and the prober 10 performs the alignment of the stage 11 based on a position of the photographed target mark 26.

Figure 3:
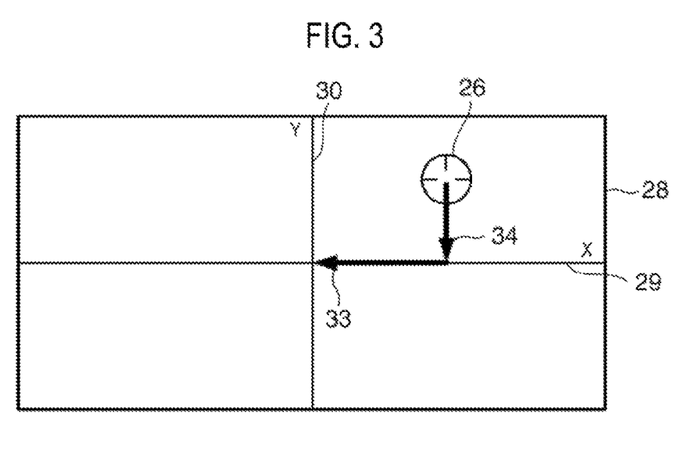
FIG. 3 is a view illustrating a stage alignment method.

FIG. 3 is a view illustrating a stage alignment method.

In FIG. 3, the target image photographed by the alignment bridge camera (hereinafter, simply referred to as a "photographed image") 28 has a coordinate system defined by an X axis 29 and a Y axis 30 perpendicular to each other in the horizontal plane. Further, in the prober 10, the alignment bridge camera is installed at the alignment bridge 25 such that the X axis 29 follows the X direction 31 and the Y axis 30 follows the Y direction 32. That is, in this embodiment, the X axis 29 corresponds to the X direction 31 and the Y axis 30 corresponds to the Y direction 32.

Here, when the X axis 29 and the Y axis 30 of the coordinate system of the photographed image 28 coincide with the X direction 31 and the Y direction 32, respectively, a displacement amount from the target mark 26 to the origin of the coordinate system (hereinafter, referred to as a "coordinate origin") in the photographed image 28, specifically a displacement amount along the X axis 29 (hereinafter, referred to as an "X-axis displacement amount") 33 and a displacement amount along the Y axis 30 (hereinafter, referred to as a "Y-axis displacement amount") 34 are calculated, and the X-axis displacement amount 33 and the Y-axis displacement amount 34 are respectively converted into a displacement amount of the stage 11 in the X direction 31 (hereinafter, referred to as an "X-direction displacement amount") and a displacement amount of the stage 11 in the Y direction 32 (hereinafter, referred to as a "Y-direction displacement amount"), whereby the alignment of the stage 11 can be performed. Specifically, the stage 11 is moved in the X direction 31 and the Y direction 32 by the converted X-direction displacement amount and Y-direction displacement amount, respectively, whereby the alignment of the stage 11 can be performed.

Figure 4:
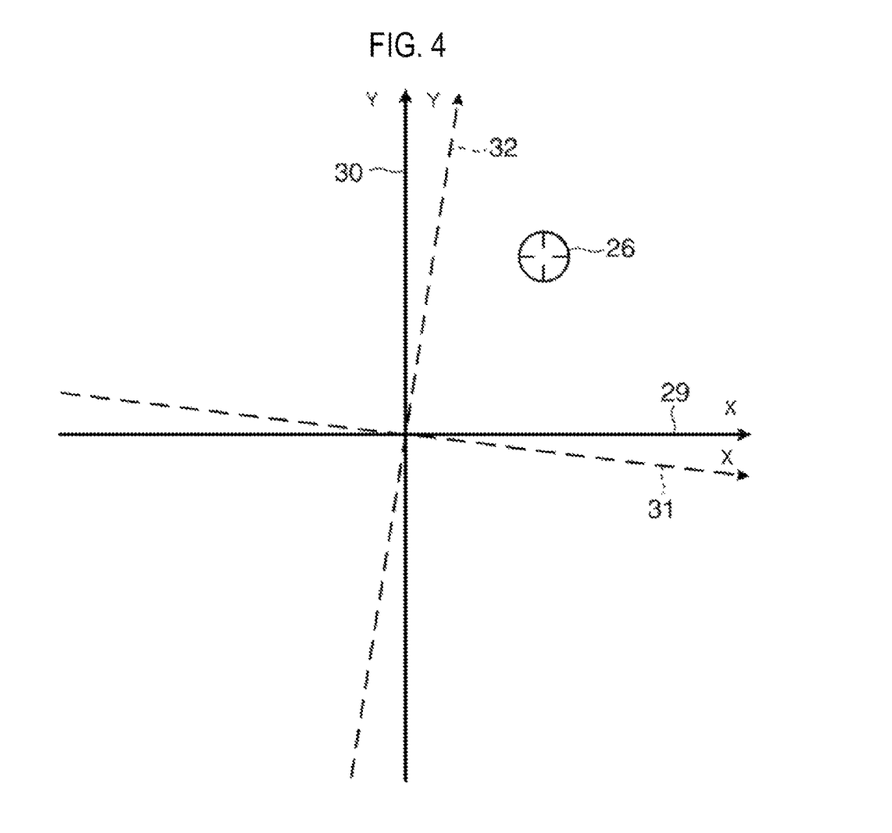
FIG. 4 is a view illustrating a deviation of each axis in a coordinate system of a photographed image of an ASU camera with respect to a moving direction of the stage.

However, as described above, due to an installation defect of the alignment bridge camera to the alignment bridge 25 or an influence such as an aberration of a lens in the alignment bridge camera or a deviation of the stage 11 in the moving direction (specifically, a state in which the X direction 31 and the Y direction 32 are not accurately perpendicular to each other), the X axis 29 and the Y axis 30 may not coincide with the X direction 31 and the Y direction 32, respectively. That is, for example, as illustrated in FIG. 4, the X axis 29 may be deviated in the rotational direction by a minute rotation angle with respect to the X direction 31, and the Y axis 30 may be deviated in the rotational direction by a minute rotation angle with respect to the Y direction 32. Particularly, since the aberration of the lens varies depending on a direction, the deviation of the X axis 29 in the rotational direction with respect to the X direction 31 or the deviation of the Y axis 30 in the rotational direction with respect to the Y direction 32 vary in each quadrant in the coordinate system of the photographed image 28.

In this case, although the X-axis displacement amount 33 and the Y-axis displacement amount 34 are calculated from a position of the target mark 26 in the photographed image 28, the calculated X-axis displacement amount 33 and the calculated Y-axis displacement amount 34 include a deviation of the X axis 29 in the rotational direction with respect to the X direction 31 or a deviation of the Y axis 30 in the rotational direction with respect to the Y direction 32. Hence, even though the X-axis displacement amount 33 and the Y-axis displacement amount 34 are converted into an X-direction displacement amount and a Y-direction displacement amount and the stage 11 is moved in the X direction 31 and the Y direction 32 by the calculated X-direction displacement amount and the calculated Y-direction displacement amount, the alignment of the stage 11 cannot be performed accurately.

Figure 5A:
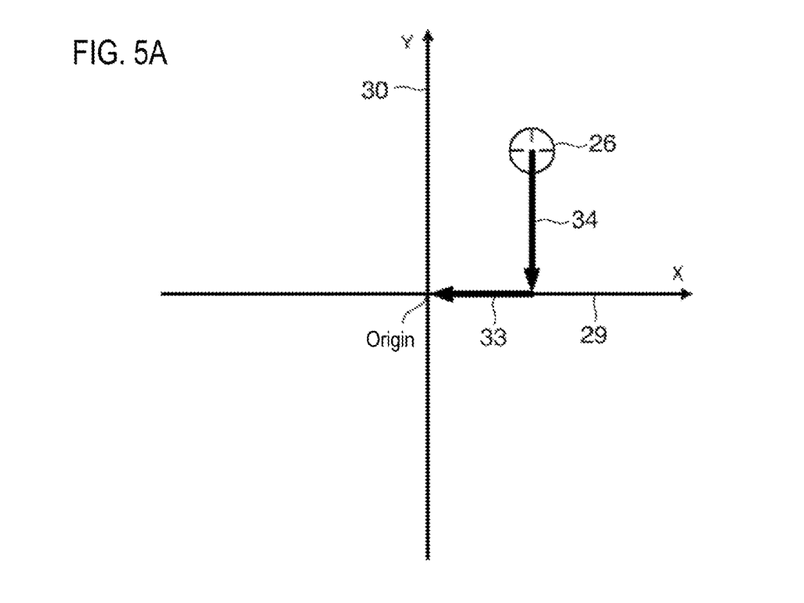
FIGS. 5A and 5B are views illustrating a problem in the stage alignment method, which occurs due to the deviation of each axis in the coordinate system of a photographed image with respect to the moving direction of the stage.

For example, when the alignment of the stage 11 is performed, first, as illustrated in FIG. 5A, an X-axis displacement amount 33 and a Y-axis displacement amount 34 are calculated so that the target mark 26 in the photographed image 28 coincides with the coordinate origin. Subsequently, the X-axis displacement amount 33 is converted into an X-direction displacement amount 35, and the Y-axis displacement amount 34 is converted into a Y-direction displacement amount 36.

Here, if it is assumed that the X axis 29 and the Y axis 30 coincide with the X direction 31 and the Y direction 32, respectively, it is conceived that the X-direction displacement amount 35 converted from the X-axis displacement amount 33 along the X axis 29 follows the X direction 31, and that the Y-direction displacement amount 36 converted from the Y-axis displacement amount 34 along the Y axis 30 follows the Y direction 32. For this reason, it is conceived that in order to perform the alignment of the stage 11, the stage 11 has only to be moved by the X-direction displacement amount 35 along the X direction 31 and moved by the Y-direction displacement amount 36 along the Y direction 32.

Figure 5B:
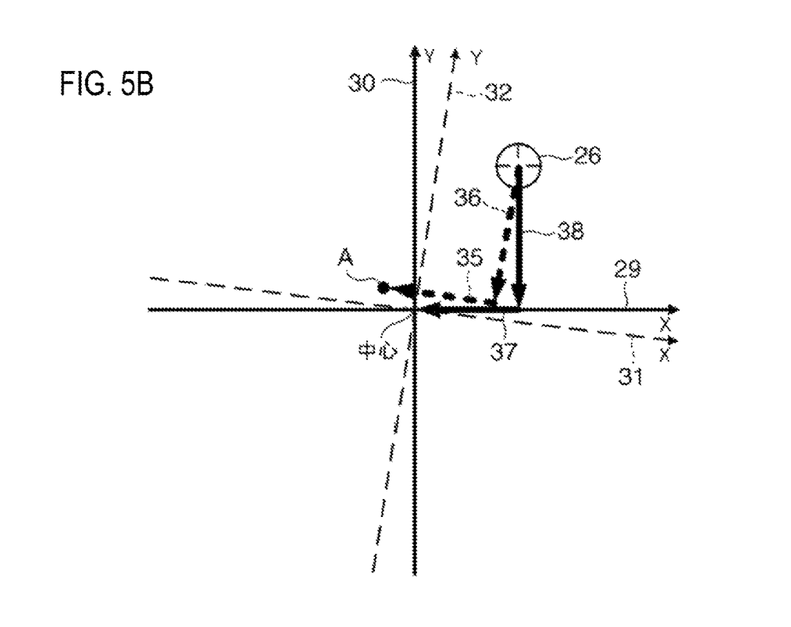

However, since the position of the target mark 26, which represents a position of the stage 11, is measured in the coordinate system of the photographed image 28, in order for the target mark 26 to coincide with the center (coordinate origin) of the stage 11, as illustrated in FIG. 5B, it is required to move the stage 11 along the X axis 29 by the X-direction displacement amount 37 converted from the X-axis displacement amount 33 and move the stage 11 along the Y axis 30 by the Y-direction displacement amount 38 converted from the Y-axis displacement amount 34. When the X axis 29 is deviated in the rotational direction with respect to the X direction 31 and the Y axis 30 is deviated in the rotational direction with respect to the Y direction 32, although the stage 11 is moved by the X-direction displacement amount 35 along the X direction 31 and moved by the Y-direction displacement amount 36 along the Y direction 32 as described above, the target mark 26 merely moves to a point A different from the coordinate origin, and does not coincide with the coordinate origin.

Accordingly, in this embodiment, a deviation of the X axis 29 in the rotational direction with respect to the X direction 31 or a deviation of the Y axis 30 in the rotational direction with respect to the Y direction 32 (hereinafter, these deviations are generically referred to as "rotation correcting angles") is calculated in each quadrant in the coordinate system of the photographed image 28.

FIGS. 6A to 6E are process views illustrating a method of calculating a rotation correcting angle in each quadrant of the coordinate system of a photographed image of the ASU camera.

Figure 6A:
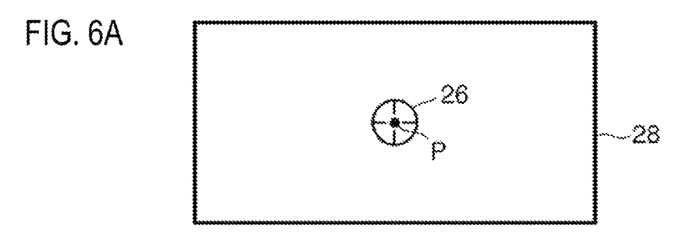
FIGS. 6A to 6E are process views illustrating a method of calculating a rotation correcting angle in each quadrant of the coordinate system of a photographed image of the ASU camera.

First, the target mechanism of the stage 11 is photographed by the alignment bridge camera, and the position of the target mark 26 in a photographed image 28 is registered as a registration position P (FIG. 6A).

Figure 6B:
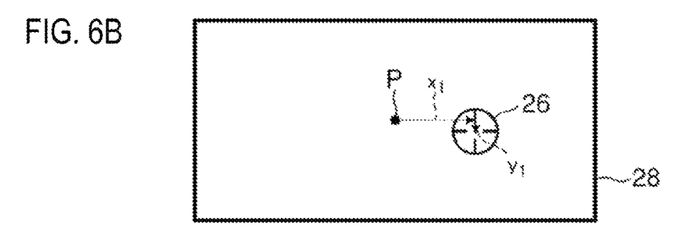

Subsequently, the stage 11 is moved by α (a predetermined amount) along the X direction 31. Thereafter, the target mechanism of the stage 11 is photographed by the alignment bridge camera, and a displacement amount from the registration position P to the position of the moved target mark 26 in the photographed image 28 (hereinafter, referred to as a "mark displacement amount") is measured in pixels of the image (FIG. 6B). Here, the mark displacement amount is, for example, x1 along the X axis 29 and y1 along the Y axis 30.

Figure 6C:
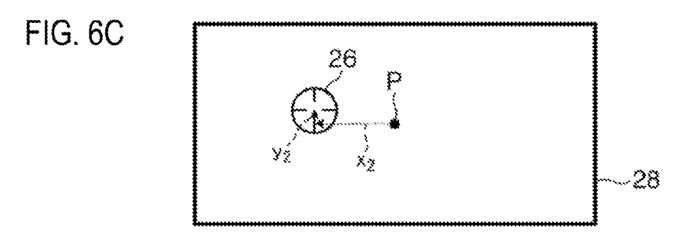

Subsequently, the stage 11 is moved such that the target mark 26 coincides with the registration position P, and the stage 11 is then moved by −α (the predetermined amount) along the X direction 31. Thereafter, the target mechanism of the stage 11 is photographed by the alignment bridge camera, and a mark displacement amount is measured in pixels (FIG. 6C). Here, the mark displacement amount is, for example, x2 along the X axis 29 and y2 along the Y axis 30.

Figure 6D:
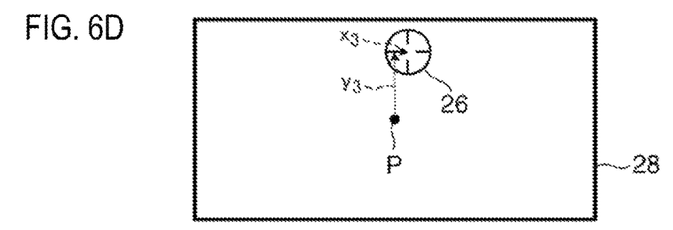

Subsequently, the stage 11 is moved such that the target mark 26 coincides with the registration position P, and the stage 11 is then moved by α (the predetermined amount) along the Y direction 32. Thereafter, the target mechanism of the stage 11 is photographed by the alignment bridge camera, and a mark displacement amount is measured in pixels (FIG. 6D). Here, the mark displacement amount is, for example, x3 along the X axis 29 and y3 along the Y axis 30.

Figure 6E:
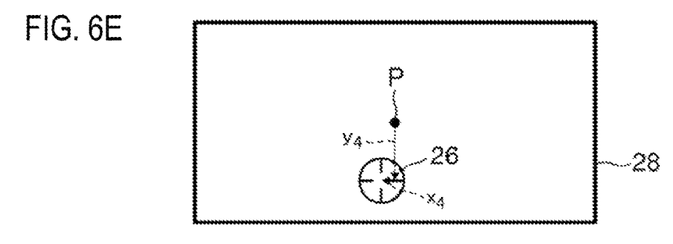

Subsequently, the stage 11 is moved such that the target mark 26 coincides with the registration position P, and the stage 11 is then moved by −α (the predetermined amount) along the Y direction 32. Thereafter, the target mechanism of the stage 11 is photographed by the alignment bridge camera, and a mark displacement amount is measured in pixels (FIG. 6E). Here, the mark displacement amount is, for example, x4 along the X axis 29 and y4 along the Y axis 30.

Figure 7:
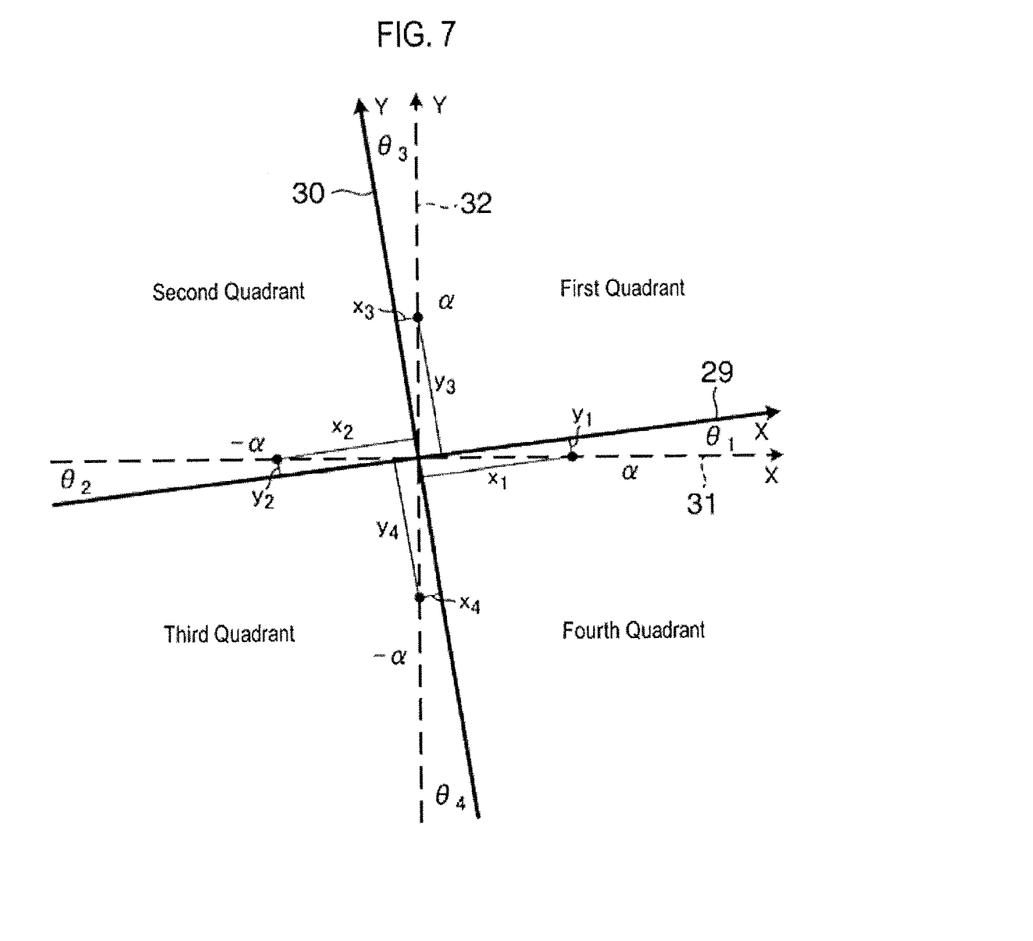
FIG. 7 is a view illustrating a rotation correcting angle in each quadrant of the coordinate system of a photographed image of the ASU camera.

Thereafter, a rotation correcting angle is calculated for each quadrant in a coordinate system of the photographed image 28. Specifically, as illustrated in FIG. 7, when assuming that the registration position P is the coordinate origin in the coordinate system of the photographed image 28, a rotation correcting angle θ1 of a first quadrant is calculated by the following Equation (1) using the mark placement amount (x1, y1) of the target mark 26 (indicated as "●" in FIG. 7) when the stage 11 is moved by α along the X direction 31.

$$\theta1 = \arctan(-y1/x1) \tag{1}$$

A rotation correcting angle θ3 of a second quadrant is calculated by the following Equation (2) using the mark placement amount (x3, y3) of the target mark 26 (indicated as "●" in FIG. 7) when the stage 11 is moved by α along the Y direction 32.

$$\theta3 = \arctan(-y3/x3) \tag{2}$$

A rotation correcting angle θ2 of a third quadrant is calculated by the following Equation (3) using the mark placement amount (x2, y2) of the target mark 26 (indicated as "●" in FIG. 7) when the stage 11 is moved by −α along the X direction 31.

$$\theta2 = \arctan(-y2/x2) \tag{3}$$

A rotation correcting angle θ4 of a fourth quadrant is calculated by the following Equation (4) using the mark placement amount (x4, y4) of the target mark 26 (indicated as "●" in FIG. 7) when the stage 11 is moved by −α along the Y direction 32.

$$\theta4 = \arctan(-y4/x4) \tag{4}$$

Next, a stage alignment method as a control method of the substrate inspection apparatus in this embodiment will be described.

First, a position of the target mark 26 in the photographed image 28 is measured in pixels. The position of the target mark 26 is corrected by using the rotation correcting angles θ1 to θ4 according to the position of the target mark 26.

Specifically, when the target mark 26 is placed in the first quadrant of the photographed image 28, a position (x', y') of the target mark 26, from which an influence of the rotation correcting angle is removed, (hereinafter, referred to as a "position after correction of the target mark 26"), is calculated by correcting the position (x, y) of the target mark 26 using Equations (5) and (6).

$$x' = x \times \cos\theta1 - y \times \sin\theta3 \tag{5}$$

$$y'=x\times\sin\theta1+y\times\cos\theta3 \quad (6)$$

When the target mark 26 is placed in the second quadrant of the photographed image 28, a position (x', y') after correction of the target mark 26 is calculated by correcting the position (x, y) of the target mark 26 using Equations (7) and (8).

$$x'=x\times\cos\theta3-y\times\sin\theta2 \quad (7)$$

$$y'=x\times\sin\theta3+y\times\cos\theta2 \quad (8)$$

When the target mark 26 is placed in the third quadrant of the photographed image 28, a position (x', y') after correction of the target mark 26 is calculated by correcting the position (x, y) of the target mark 26 using Equations (9) and (10).

$$x'=x\times\cos\theta2-y\times\sin\theta4 \quad (9)$$

$$y'=x\times\sin\theta2+y\times\cos\theta4 \quad (10)$$

When the target mark 26 is placed in the fourth quadrant of the photographed image 28, a position (x', y') after correction of the target mark 26 is calculated by correcting the position (x, y) of the target mark 26 using Equations (11) and (12).

$$x'=x\times\cos\theta4-y\times\sin\theta1 \quad (11)$$

$$y'=x\times\sin\theta4+y\times\cos\theta1 \quad (12)$$

Thereafter, the X-axis displacement amount 33 and the Y-axis displacement amount 34 are calculated based on the position (x', y') after correction of the target mark 26, and the X-axis displacement amount 33 and the Y-axis displacement amount 34 are converted into a displacement amount X' along the X direction 31 and a displacement amount Y' along the Y-direction 32, respectively, thereby performing the alignment of the stage 11. Conversion coefficients used for the conversion into the displacement amount X' along the X direction 31 and the displacement amount Y' along the Y-direction 32 is calculated as described below. In addition, the calculation of the conversion coefficients is performed before the alignment of the stage 11 is performed.

Figure 8:
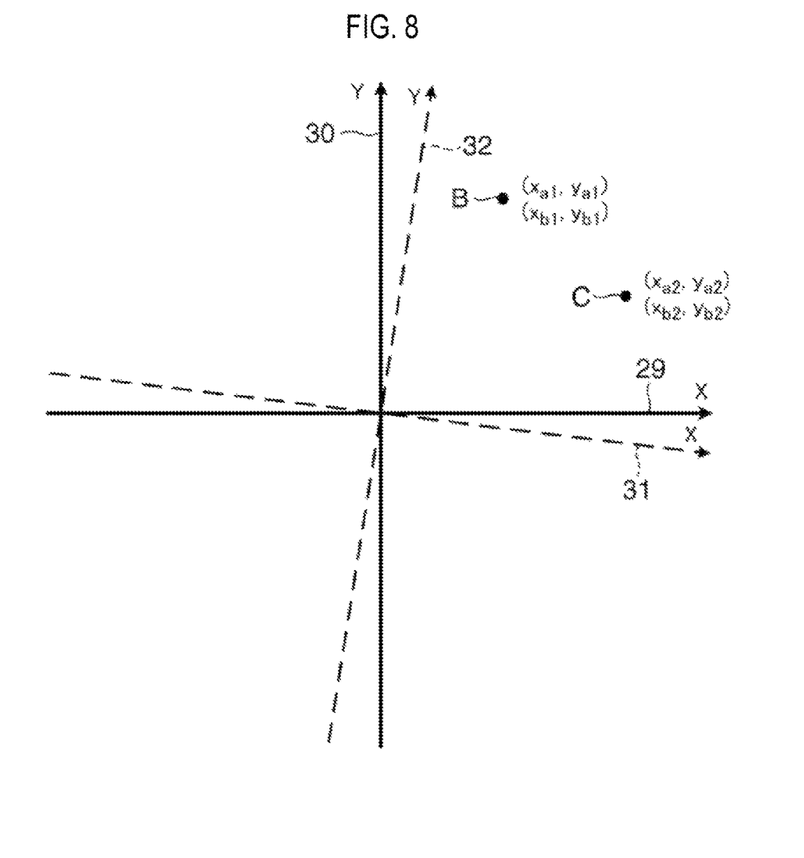
FIG. 8 is a view illustrating a method of calculating a conversion coefficient used to convert a position of a target mark into a displacement amount of the stage in an X direction or a displacement amount of the stage in a Y direction.

For example, as illustrated in FIG. 8, measured are positions of two points B and C in a coordinate system of the photographed image 28 (hereinafter, referred to as an "image coordinate system") and positions of the two points B and C in a coordinate system configured by the X direction 31 and the Y direction 32 (hereinafter, referred to as a "stage coordinate system"). In the image coordinate system, positions are measured in pixels. Here, the position of the point B in the image coordinate system is set to (xa1, ya1), and the position of the point B in the stage coordinate system is set to (xb1, yb1). Meanwhile, the position of the point C in the image coordinate system is set to (xa2, ya2), and the position of the point C in the stage coordinate system is set to (xb2, yb2). In this case, conversion coefficients a to d are calculated by the following Equations (13) to (16).

$$a=(ya2\times xb1-ya1\times xb2)/(xa1\times ya2-xa2\times ya1) \quad (13)$$

$$b=(xa1\times xb2-xa2\times xb1)/(xa1\times ya2-xa2\times ya1) \quad (14)$$

$$c=(ya2\times yb1-ya1\times yb2)/(xa1\times ya2-xa2\times ya1) \quad (15)$$

$$d=(xa1\times yb2-xa2\times yb1)/(xa1\times ya2-xa2\times ya1) \quad (16)$$

In addition, the displacement amount X' of the stage 11 along the X direction 31 and the displacement amount Y' of the stage 11 along the Y direction 32 are calculated by the following Equations (17) and (18), using the calculated conversion coefficients a to d and the position (x', y') after correction of the target mark 26.

$$X'=a\times x'+b\times y' \quad (17)$$

$$Y'=c\times x'+d\times y' \quad (18)$$

According to the stage alignment method in this embodiment, a deviation (rotation correcting angle) of the X axis 29 in the rotational direction with respect to the X direction 31 or a deviation (rotation correcting angle) of the Y axis 30 in the rotational direction with respect to the Y direction 32, which relates to the movement of the stage 11, is calculated for each quadrant of the image coordinate system, and the position of the photographed target mark 26 is corrected based on the calculated rotation correcting angles. Accordingly, the influence of the deviation of the X axis 29 in the rotational direction with respect to the X direction 31 or the deviation of the Y axis 30 in the rotational direction with respect to the Y direction 32 can be surely removed from the position of the target mark 26 in the photographed image 28. As a result, an accurate alignment of the stage 11 can be performed based on the corrected position of the target mark 26.

Further, the distance in the photographed image 28 is inaccurate due to an influence of an aberration of the lens in the alignment bridge camera. According to the stage alignment method in this embodiment, when a rotation correcting angle is calculated, a displacement amount (a mark displacement amount) from a registration position P of the target mark 26 in the photographed image 28 to a position of the target mark 26 is measured in pixels of the photographed image 28. Since the number of pixels of the photographed image 28 is not influenced by the aberration of the lens, the mark displacement amount can be accurately measured. Thus, the influence of aberration of the lens can be removed from a rotation correcting angle in each quadrant.

Hereinbefore, although the present disclosure has been described using the above-described embodiments, the present disclosure is not limited to the above-described embodiments.

For example, while the present disclosure has been applied to the prober 10, the application of the present disclosure is not limited to the prober 10, and any apparatus may appropriately use the present disclosure as long as it is an apparatus including, for example, a stage which has a substrate mounted thereon and accurately controls the position in a horizontal plane of the substrate.

The present disclosure may be realized by providing a computer, for example, the control part 27, with a storage medium which stores program codes of software implementing the functions of the above-described embodiments and allowing a CPU of the control part 27 to read out and execute the program codes stored in the storage medium.

In this case, the program codes read out from the storage medium implement the functions of the above-described embodiments by themselves, and thus, the program codes and the storage medium which stores the program codes constitute the present disclosure.

Also, the storage medium for supplying the program codes may be, e.g., a RAM, an NVRAM, a floppy (registered trademark) disc, a hard disc, a magnetic-optical disc, an optical disc, such as a CD-ROM, a CD-R, a CD-RW, or a DVD (a DVD-ROM, a DVD-RAM, a DVD-RW, and a DVD+RW), a magnetic tape, a non-volatile memory card, another ROM or the like if it can store the program codes. Alternatively, the program codes may be supplied to the control part 27 by downloading them from another computer (not illustrated), a database or the like connected to the Internet, a commercial network, a local area network or the like.

In addition, the functions of the above-described embodiments may be realized not only by executing the program codes read out by the control part 27, but also by allowing an OS (operating system) or the like that operates on the CPU to perform a part or all of the actual operations based on instructions of the program codes.

Further, the functions of the above-described embodiments may also be realized by writing the program codes read out from the storage medium in a memory provided in a function expansion board inserted into the control part 27 or a function expansion unit connected to the control part 27 and then allowing a CPU or the like provided in the expansion board or the expansion unit to perform a part or all of the actual operations based on instructions of the program codes.

The form of the program codes may be object codes, program codes executed by an interpreter, script data supplied to an OS, or the like.

According to the present disclosure, calculated is a deviation of the X axis in the rotational direction in the coordinate system of the photographed image of the camera with respect to a first moving direction of the stage or a deviation of the Y axis in the rotational direction in the coordinate system of the photographed image of the camera with respect to a second moving direction of the stage, and the position of the photographed target in the coordinate system of the photographed image of the camera is corrected based on the calculated deviation in the rotational direction. Since the aberration of a lens in the camera varies depending on a direction, the deviation of the X axis in the rotational direction with respect to the first moving direction or the deviation of the Y axis in the rotational direction with respect to the second moving direction is different in each quadrant in the coordinate system of the photographed image of the camera. In the present disclosure, a deviation of the X axis in the rotational direction with respect to the first moving direction or a deviation of the Y axis in the rotational direction with respect to the second moving direction is calculated in each quadrant in the coordinate system of the photographed image of the camera. Accordingly, the influence of the deviation of the X axis in the rotational direction with respect to the first moving direction or the deviation of the Y axis in the rotational direction with respect to the second moving direction can be surely removed from the position of the target in the coordinate system of the photographed image of the camera. As a result, an accurate stage alignment can be performed based on the corrected position of the target.

While certain embodiments have been described, these embodiments have been presented by way of example only, and are not intended to limit the scope of the disclosures. Indeed, the embodiments described herein may be embodied in a variety of other forms. Furthermore, various omissions, substitutions and changes in the form of the embodiments described herein may be made without departing from the spirit of the disclosures. The accompanying claims and their equivalents are intended to cover such forms or modifications as would fall within the scope and spirit of the disclosures.

What is claimed is:

1. A method of controlling a substrate inspection apparatus, wherein the substrate inspection apparatus includes a stage, which is configured to mount a substrate thereon and has a target moving integrally together with the stage, and a camera configured to photograph an image of the target, and wherein the stage moves in a positive direction or a negative direction along a first moving axis in a horizontal plane and in a positive direction or a negative direction along a second moving axis perpendicular to the first moving axis in the horizontal plane, the camera is arranged to face the horizontal plane, a coordinate system of the image photographed by the camera is defined by an X axis and a Y axis perpendicular to each other in the horizontal plane, the X axis corresponds to the first moving axis, and the Y axis corresponds to the second moving axis, the method comprising:

obtaining first to fourth rotational correcting angles, the first rotational correcting angle corresponding to a deviation of the X axis in a rotational direction with respect to the positive direction along the first moving axis, the second rotational correcting angle corresponding to a deviation of the X axis in a rotational direction with respect to the negative direction along the first moving axis, the third rotational correcting angle corresponding to a deviation of the Y axis in a rotational direction with respect to the positive direction along the second moving axis, and the fourth rotational correcting angle corresponding to a deviation of the Y axis in the rotational direction with respect to the negative direction along the second moving axis;

obtaining a first image of the target photographed by the camera;

measuring a position of the target in the first image as a measured position;

detecting one of four quadrants divided by the X axis and the Y axis as a detected quadrant in which the target is placed in the first image;

obtaining a corrected position of the target by correcting the measured position of the target based on the first to fourth rotational correcting angles and the detected quadrant; and performing an alignment of the stage based on the corrected position of the target.

2. The method of claim 1, wherein performing an alignment of the stage includes:

calculating a stage displacement amount along the first moving axis and the second moving axis based on the corrected position of the target; and moving the stage along the first moving axis and the second moving axis by the calculated stage displacement amount.

3. The method of claim 1, wherein obtaining first to fourth rotational correcting angles includes:

obtaining a second image of the target photographed by the camera;

registering a position of the target in the second image as a registered position;

obtaining the first rotational correcting angle by moving the stage from the registered position by a predetermined amount in the positive direction along the first moving axis, and calculating the first rotating correcting angle based on a displacement amount of the target from the registered position along the X axis and the Y axis;

obtaining the second rotational correcting angle by moving the stage from the registered position by a predetermined amount in the negative direction along the first moving axis, and calculating the second rotating correcting angle based on a displacement amount of the target from the registered position along the X axis and the Y axis;

obtaining the third rotational correcting angle by moving the stage from the registered position by a predetermined amount in the positive direction along the second moving axis, and calculating the third rotating correcting angle based on a displacement amount of the target from the registered position along the X axis and the Y axis; and obtaining the fourth rotational correcting angle by moving the stage from the registered position by a predetermined amount in the negative direction along the second moving axis, and calculating the fourth rotating correcting angle based on a displacement amount of the target from the registered position along the X axis and the Y axis.

4. The method of claim 3, wherein the displacement amount of the target from the registered position is measured in pixels.

5. A substrate inspection apparatus, comprising:
a stage configured to mount a substrate thereon and has a target moving integrally together with the stage; and
a camera configured to photograph an image of the target,
wherein the stage moves in a positive direction or a negative direction along a first moving axis in a horizontal plane and in a positive direction or a negative direction along a second moving axis perpendicular to the first moving axis in the horizontal plane, the camera is arranged to face the horizontal plane, a coordinate system of an image photographed by the camera is defined by an X axis and a Y axis perpendicular to each other in the horizontal plane, the X axis corresponds to the first moving axis, and the Y axis corresponds to the second moving axis, and
wherein the substrate inspection apparatus further comprising a control part configured to:
obtain first to fourth rotational correcting angles, the first rotational correcting angle corresponding to a deviation of the X axis in a rotational direction with respect to the positive direction along the first moving axis, a second rotational correcting angle corresponding to a deviation of the X axis in a rotational direction with respect to the negative direction along the first moving axis, a third rotational correcting angle corresponding to a deviation of the Y axis in a rotational direction with respect to the positive direction along the second moving axis, and a fourth rotational correcting angle corresponding to a deviation of the Y axis in the rotational direction with respect to the negative direction along the second moving axis;

obtain a first image of the target photographed by the camera;

measure a position of the target in the first image as a measured position;

detect one of four quadrants divided by the X axis and the Y axis as a detected quadrant in which the target is placed in the first image;

obtain a corrected position of the target by correct the measured position of the target based on the first to fourth rotational correcting angles and the detected quadrant; and perform an alignment of the stage based on the corrected position of the target.

6. The method of claim 1, wherein obtaining a corrected position of the target includes:
when the detected quadrant is a first quadrant, correcting the measured position of the target based on the first rotational correcting angle and the third rotational correcting angle;

when the detected quadrant is a second quadrant, correcting the measured position of the target based on the second rotational correcting angle and the third rotational correcting angle;

when the detected quadrant is a third quadrant, correcting the measured position of the target based on the second rotational correcting angle and the fourth rotational correcting angle; and when the detected quadrant is a fourth quadrant, correcting the measured position of the target based on the first rotational correcting angle and the fourth rotational correcting angle.

* * * * *